Aug. 6, 1957 W. G. GREEN 2,801,820
FULL-OPENING, NON-SCORING PLUG VALVE
Filed Nov. 17, 1952

INVENTOR
WILLIAM G. GREEN
BY
F. D. Copeland
AGENT

United States Patent Office 2,801,820
Patented Aug. 6, 1957

2,801,820
FULL-OPENING, NON-SCORING PLUG VALVE

William G. Green, Garland, Tex.

Application November 17, 1952, Serial No. 320,929

1 Claim. (Cl. 251—88)

This invention relates generally to valves, and more specifically to an improved plug type valve for opening and closing or metering a high pressure line.

The primary object of this invention is to provide a self-seating plug valve employing a universally mounted tapered plug.

Another object of this invention is to provide a valve which employs a solid exterior surface plug for precision seating against the valve seat containing ports.

A still further object is to provide a valve which positively shuts off a high pressure line without leaks with a minimum of packing material.

Yet another object is to provide a valve having a solid tapered plug which lifts vertically off its valve seat so that there is no tendency to score the plug horizontally as in the rotary type plug valve.

A still further object is to provide a plug valve of this type which includes a lift screw and plug construction whereby the plug may be raised completely above the ports so that a full unrestricted opening and a small sump is provided in the pressure line when the valve is fully opened.

Yet another object of this invention is to provide a valve embodying all of the above advantages and yet constructed extremely economically and with a minimum number of parts.

It will be observed that this valve avoids a difficulty of many conventional needle valves known as wire drawing since the plug presents a large surface area for the fluid to pass over even when the valve is metered to its smallest opening.

These and other objects and advantages of the invention will become apparent from the following description, and for the purposes of illustration but not for limitation and embodiment of the invention is shown in the accompanying drawing in which.

Figure 1:
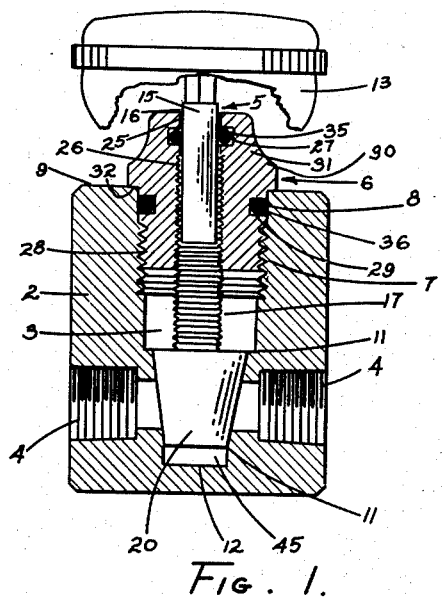
Fig. 1 represents a cross sectional elevational view of the complete valve in its fully closed position.
Figure 4:
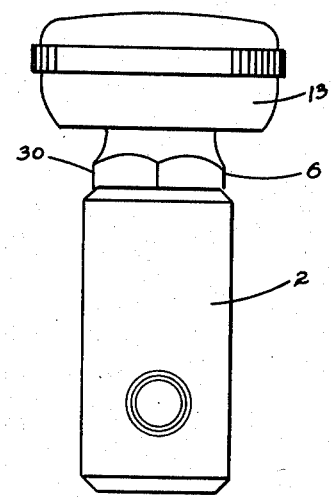
Fig. 4 represents an end elevational view of the complete valve.

Referring now more particularly to the characters of the drawing, in Fig. 1 a valve of this invention is seen to consist basically of a body 2 including plug opening 3 and ports 4, and valve stem assembly 5 inserted through opening 3, and a valve stem housing 6 threadedly attached to body 2 and guiding stem assembly 5.

Body 2 may be made directly from bar stock of bronze, stainless steel, carbon steel, or other suitable material. Opening 3 includes threads 7 near the upper end, with a counterbore 8 adjacent the top surface 9 and a tapered valve seat 11 and terminates in a flat bottom 12 at its lower end. Ports 4 extend through the sides of body 2 and open into valve seat 11 thus forming a straight through passage when not obstructed.

Valve stem assembly 5 includes a relatively long stem 15 including a shank 16, a threaded portion 17 and terminating in a knob 18 at its lower end; knob 18 cooperates with the internal cup 19 of plug 20 to form a universal joint. After knob 18 is positioned within cup 19, it is secured therein by means of retaining ring 21 which is snapped into groove 22. Knob 18 is hemispherical in construction and includes a shoulder 23 at its horizontal diameter. Cup 19 is formed by a drill bit and requires no additional machining which adds to the economy of this valve. At its top end, stem 15 is attached to handle 13 in any conventional manner (not shown).

Valve stem housing 6 includes a central straight bore 25, a threaded bore 26, and a groove 27, all forming its internal configuration. Externally housing 6 includes threads 28, a ring groove 29, a wrench-flat or nut portion 30, and an upstanding cap portion 31. The underside 32 of nut portion 30 is machined flat to engage top surface 9 when assembled.

Upon assembly of the complete valve, O ring 35 is placed in groove 27 prior to attachment of handle 13 to stem 15, and the housing 6 is slipped over the top end of stem 15. O ring 36 is then placed in groove 29 and the now assembled housing and stem combination is threaded by means of its threads 28 into body threads 7 until underside 32 of housing 6 shoulders against top surface 9 of body 2. At this point, O rings 35 and 36 are effectively installed in pressure-sealing relation to the only openings (other than the ports) in the assembly. To complete the installation in a fluid line, pressure fittings are attached to ports 4. Either port may connect to a pressure line as the valve operates equally well for either direction of pressure flow.

Operation

Starting with the valve in its closed position as shown in Fig. 1, the operation may be followed through the other views. With the handle 13 rotated to its maximum clockwise position knob 18 is pressing against the bottom walls 37 of cup 19 and the tapered circumference 38 of plug 20 engages the tapered valve seat 11 whereby the openings 39 made by ports 4 intersecting valve seat 11 are completely blocked and any flow between the two ports 4 is effectively shut off. Since plug 20 is swivelly mounted to stem 15 it will float into the position required to form a perfect seal with valve seat 11.

Figure 2:
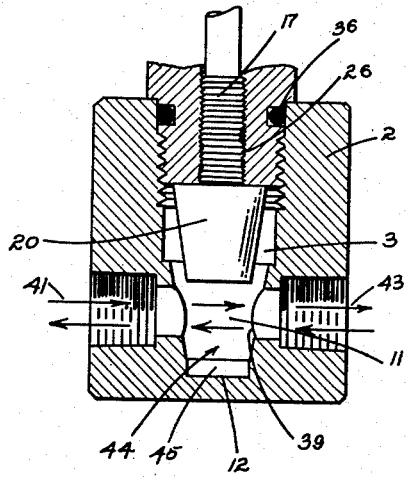
Fig. 2 represents a cross sectional view of the body of the valve of this invention with the plug in its fully raised position.
Figure 3:
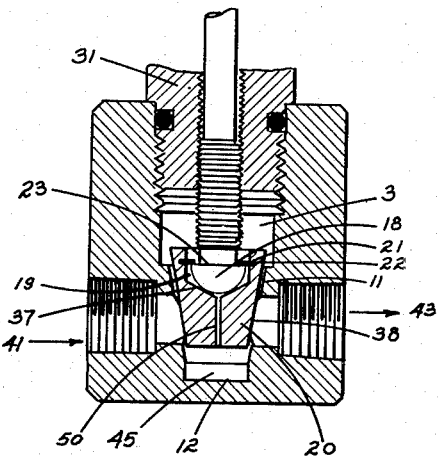
Fig. 3 represents a cross sectional view of the body of the valve of this invention with the plug shown in full section and in its position immediately after opening the valve.

Upon rotating handle 13 in a counter-clockwise direction, the threads of portion 17 cooperate with threads 26 to raise stem 15 as seen in Fig. 2. During this action, knob 18 rises off the bottom 37 of cup 19 until it engages the underside of retaining ring 21, whereupon further turning releases the engagement between surface 38 and seat 11 and raises plug 20. It will be noted that at the instant the engagement of tapered surfaces 38 and 11 is broken, the movement of plug 20 is vertical only and plug 20 does not turn horizontally at this instant as would rotary type plug valves. The advantage of this particular action is that any scoring that would take place between the plug and the valve seat would be in a vertical direction and would not be the cause of later leaks; the time involved being momentary only would in itself decrease the possibility of scoring. In rotary plug type valves, the plug being in contact with the valve seat will permit horizontal scoring of 180° and this scoring on the plug or seat between the inlet and outlet ports will permit leaks under pressure between the two ports, By raising plug 20 off seat 11 in small increments as indicated in Fig. 3, a metering valve is obtained. Fluid under pressure entering at port 4 as shown by arrow 41 will cause pressure to be applied equally around plug 20 and the increment opening will be maintained and the outgoing fluid (arrow 43) will be metered at a constant rate. It should be understood that the fluid flow may be in either direction, as indicated by the arrows in Fig. 2.

Rotation of handle 13 in a counter-clockwise direction may be continued until plug 20 is completely raised as shown in Fig. 2. In this position there is no restriction between the flow from one port to the other since plug 20 is completely removed from the pressure path. In fact, the open volume 44 formed by walls of the valve seat 11 and the unoccupied space of opening 3 will provide a much greater volume through the valve than in the line, and hence will tend to damp out certain undesirable pressure surges. Additionally that portion of the volume indicated at 45 below the parts will act as a small sump. A small diameter hole 50 connects the interior of cup 19 and space 45 whereby any trapped pressure therein may be bled off to the upper section of opening 3, and vice versa, so that internal pressure does not interfere with the manual operation of the control handle.

In the construction of this valve, threads 17 and 26 are right hand threads so that opening and closing the valve is accomplished by rotation of handle 13 in a conventional manner. Threads 28 and 7, however, are left hand threads so that the torque required to release the seal of surface 38 against seat 11 will not have any tendency to break the seal of threads 28 and 7 and permit housing 6 to be backed out of engagement during rotation of handle 13.

From the foregoing description it will be readily seen that there has been produced a device as substantially fulfills the object of the invention as set forth herein.

While this specification sets forth in detail the present and preferred construction of this invention, still in practice such deviations from such detail may be resorted to as do not form a departure from the spirit of the invention as defined in the appended claim.

Having thus described the invention, what is claimed as new and useful and is desired to be secured by Letters Patent is:

A fluid valve comprising a one-piece bar stock body having a horizontal opening therethrough and having a vertical opening extending from the top of said body to a point adjacent the ends of said horizontal opening and comprising interchangeable attachments for pressure lines having either direction of travel, a tapered conical valve seat near the lower end of said vertical opening, a sump below said valve seat, left-hand threads at top of said vertical opening, a one-piece housing including left-hand external threads attached to said body by engaging said top opening threads, said housing and said body defining a shallow annular channel therebetween, one O ring inserted in said channel, a stem extending longitudinally through said housing, a groove in said housing adjacent said stem, a second O ring in said groove, a generally solid, continuous surface tapered plug including a shallow drilled internal conical cup at one end, a hemispherical knob at the lower end of said stem, a flat shoulder on said knob, said knob inserted in said cup, a ring groove near the open end of said cup, a retaining ring in said ring groove and cooperating with said flat shoulder to retain said knob and plug in universal relation, a small passageway extending vertically through said plug and connecting the sump with the space above the plug in order to by-pass trapped fluid, a handle at the upper end of said stem, internal right hand threads on said housing, right-hand threads of said stem engaging said internal housing threads, said handle adapted when rotated in one direction to advance said right hand threads and through the action of said knob to seat said plug in self aligned relationship in said valve seat to close said ports and simultaneously force any fluid trapped in said sump through said passageway, and said handle adapted when rotated in the opposite direction to cause said knob shoulder to engage said retaining ring and lift said plug vertically off said seat without rotation of said plug at the instant of being released.

References Cited in the file of this patent

UNITED STATES PATENTS

| | | |
|---|---|---|
| 202,785 | Brown | Apr. 23, 1878 |
| 374,695 | Payne | Dec. 13, 1887 |
| 391,445 | Williams | Oct. 23, 1888 |
| 1,172,977 | Gillen | Feb. 22, 1916 |
| 1,881,269 | Evans | Oct. 4, 1932 |
| 1,891,533 | Gish | Dec. 20, 1932 |
| 1,916,738 | Miller | July 4, 1933 |
| 2,427,439 | Brown | Sept. 16, 1947 |
| 2,596,409 | Johnson | May 13, 1952 |